United States Patent Office 3,377,107
Patented Apr. 9, 1968

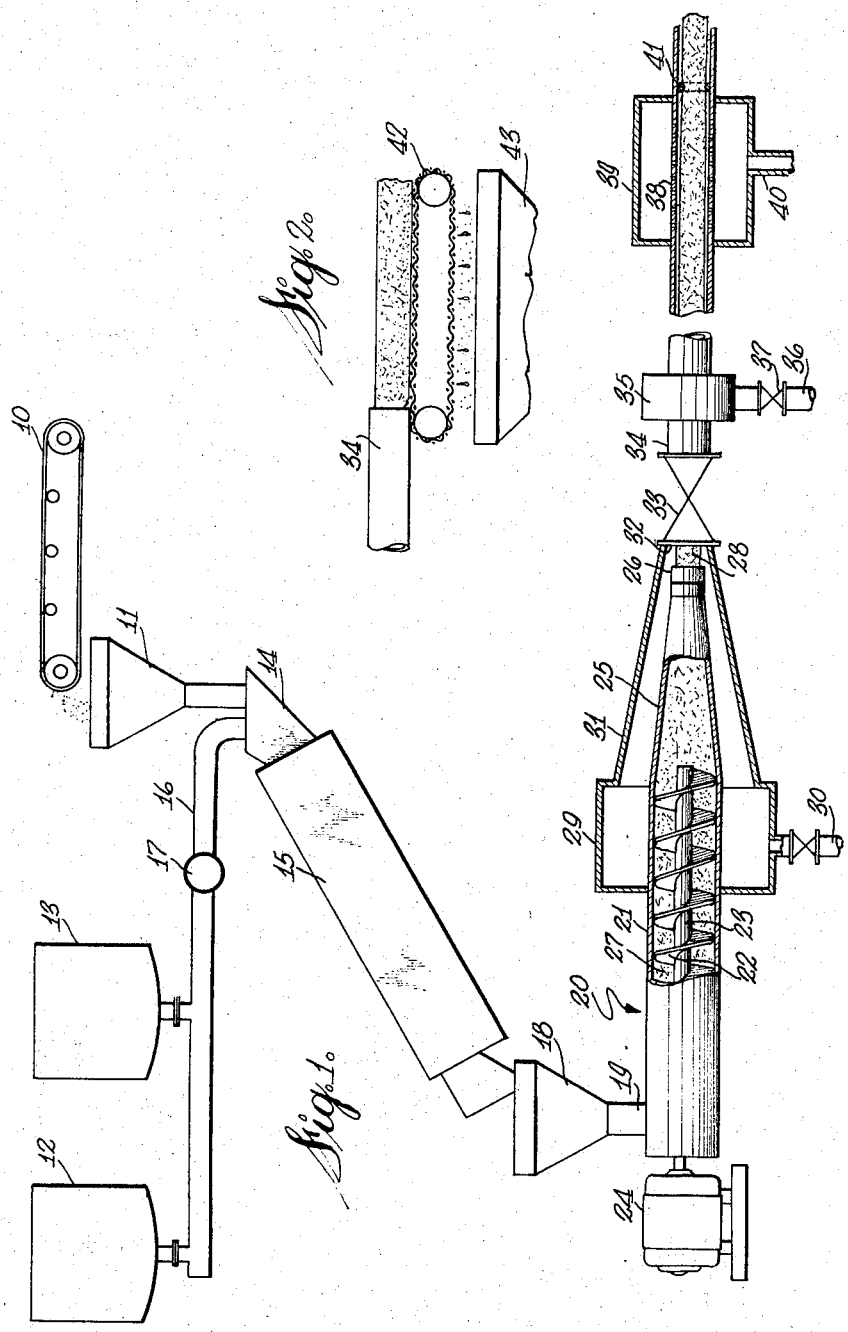

3,377,107
METHOD AND APPARATUS FOR TRANSPORTING MATERIAL IN A PIPELINE
Gordon W. Hodgson, Edmonton, Alberta, Michael E. Charles, Port Credit, Ontario, and Alfred A. Roehl, Edmonton, Alberta, Canada, assignors to Research Council of Alberta, Edmonton, Alberta, Canada, a body corporate
Filed Dec. 12, 1966, Ser. No. 601,105
10 Claims. (Cl. 302—15)

ABSTRACT OF THE DISCLOSURE

The invention relates to the long distance transport by pipeline of solids in comminuted form and has as its basic feature the substantially reduced pumping energy required when the particulate solids are pasted to a coherent cylindrical form of great length which is suspended in a moving annulus of fluid in a pipeline extending from the source of the delivery point which may be a hundred miles or more away.

---

This invention relates to a system for transporting solid material in a fluid stream in a pipeline.

Particulate solids may be transported by pipeline in slurry form but this procedure has found little practical acceptance when employed for relatively great distances, such as 100 miles or more, because of the high energy consumption required in order to keep the individual particles in suspension in the carrying liquid.

Solids may also be transported in the form of capsules or paste slugs, but this procedure has limitations because of the need for provision of discrete forms.

The flow of very dense slurries in pipelines is characterized by the onset of plug flow in which the particulate solids tend to withdraw from the pipe wall.

It is an object of the present invention to provide a process and apparatus for the pipeline transportation of particulate solids characterized by very high load factors, low energy demands, and simple recovery procedures.

In accordance with the present invention, the solids are made slightly cohesive and formed into a continuous cylindrical plug which maintains that shape under dynamic flow conditions. Thus, a substantially ideal condition in plug flow is established and maintained to the full advantage of low energy demands and ready solids recovery.

In the general practice of the present invention, the solids to be transported, such as metallic ores, sulfur, potash, or coal, are prepared in particulate form and moistened with a binding liquid, such as oil, water, or an appropriate blend of oil or water with suspended or dissolved substances. The resultant cohesive mass is then extruded into a high pressure fluid filled pipeline in such a manner that it forms a continuous semi-solid cylinder, of a diameter about 90% of the inside diameter of the transporting pipeline, inside an annulus of the pipe fluid. Extrusion of the cohesive mass and flow of the fluid serve to transport the semi-solid plug through the pipeline. The carrier fluid may be oil, water, or compressed gases.

The invention, in one aspect thereof, may be said to reside in the steps of mixing a body of said solids with a binding liquid to form a semi-rigid paste, forming said paste into a continuous cylindrical plug of substantially uniform diameter, continuously feeding said plug axially into a pipeline containing a carrier fluid, simultaneously with said feeding step pumping into said pipeline a stream of said carrier fluid in annular form and in surrounding relation to said plug, controlling the average velocity of said stream to render said velocity substantially uniform and constant throughout said pipeline and to cause flow of said plug with said stream, and continuously retrieving said plug as it flows out of the other end of said pipeline.

The invention, in another aspect thereof, resides in an apparatus for the pipeline transportation of particulate solids which comprises a high pressure pump having an inlet, and a forming die having a cylindrical discharge orifice, means for continuously feeding a mixture of particulate solids and a binding liquid to said inlet to produce a continuously extruded cylindrical plug of said mixture through said opening, a pipeline in axial communication with said orifice and having an inlet for reception of said plug, and means for feeding an annular stream of carrier fluid into said pipeline inlet substantially concurrently with said plug and in surrounding relation to said plug.

The invention will be described with reference to the accompanying drawing, in which—
FIGURE 1 is an elevation, partly in section, showing an apparatus, in somewhat diagrammatic form, for carrying out the invention, and
FIGURE 2 is an elevation showing a modified portion of the apparatus.

As previously indicated, the solids to be transported must be in particulate form. There are no critical limits as to particle size other than those dictated by the required cohesive nature and diameter of the subsequently formed cylindrical plug. A suitable size distribution is one which will result in a low porosity so that the binding effect will be enhanced and that the volume of interstitial liquid in the plug will be small. However, the particle size will normally be in the range of −4 mesh and more commonly −20 mesh.

The cohesive strength of the plug mass need not be great and, for example, not as great as in capsule flow, including paste slug flow, since the capsule body must be strong enough to withstand handling during the preparation and launching stages. Since the continuous plug flow system is believed to involve the ultimate limit of a natural phenomenon for the flow of solids in fluid suspensions, the energy required to maintain this flow configuration is minimal. While a liquid content of as little as 5% by weight is adequate to give binding strength, penetration of the carrier liquid will take place unless the entire interstitial spaces within the plug are liquid-filled during the forming process. Thus, liquid contents of about 5 to 30% by weight are generally required, the particular value depending upon the particle size distribution.

The particular binding liquid employed will depend to large extent upon the nature of the substance to be transported. For hydrophilic substances such as potash, iron ore, and many coals, the binding liquid need only be water. However, in the case of water soluble substances, such as potash, the binding liquid may be a water solution of potash, either saturated or undersaturated.

Because of the low cohesive strengths required there is no need for the binding liquid to be immiscible with the carrier liquid, nor is there any need in general for it to be different from the carrier liquid. For example, a formed plug of potash, bound by a potash brine, may be employed with a potash brine carrier liquid. Preferably, in this case, the binding brine is undersaturated with potash. For instance, a plug of potash containing 15% of brine of 20% potash content, and having a diameter 90% of the internal pipe diameter, can be carried in a saturated potash brine carrier of 27.6% potash.

Similarly, powdered coal can be bound with an oil carrying dissolved asphalt in a stream of the same oil without the asphalt. An illustrative configuration would be a 90% diameter plug wet to 15% by a Leduc crude oil with a 10% admixture of heavy crude oil residuum, in a Leduc crude oil carrier. The latter plug could also be transported in a water carrier.

A still further example is powdered sulfur formed into a plug with 18% of an emulsion of carbon disulfide in water (30–70%) and transported in a water carrier. In this instance, a hydrocarbon carrier could be substituted for the water carrier.

Further examples include the use of dissolved adhesives in a binding liquid, such as casein or latex glues in water, and oil-soluble adhesives in oil binders.

In the drawing, FIGURE 1 illustrates a preferred form of apparatus for carrying out the invention.

An endless conveyor 10 may be employed to deliver the particulate solids to be transported to a hopper 11. Binding liquids are prepared in tanks 12 and 13, the contents of which are supplied to the inlet portion 14 of a rotary mixing drum 15 through a line 16 having a proportioning pump 17 therein. The contents of hopper 11 are also continuously fed to inlet portion 14.

The rotary mixing drum 15 is of conventional form and is driven in any suitable manner. It establishes intimate contact between the particulate solids and binding liquid and forms therefrom a cohesive semi-rigid paste. The drum discharges the formed paste into a hopper 18.

Hopper 18 feeds the formed paste into the inlet 19 of a high pressure screw pump 20. Pump 20 comprises an elongated cylindrical casing 21 having axially mounted therein a helical blade 22, the shaft 23 of which is driven by a motor 24. The inlet 19 is located adjacent one end of the casing 21. Axially arranged at the other end of the casing 21 is a frustoconical forming die 25 having a discharge orifice 26. The forming die is of reducing diameter towards the discharge orifice.

It will be observed that the paste 27 in the casing 21 is delivered under pressure into the conical forming die 25 which compacts the paste into a plug 28 for discharge in generally continuous form through orifice 26.

Means are provided for effecting a coaxial flow of carrier fluid with the issuing plug from orifice 26. Such means, as shown, comprises a manifold 29 surrounding the outlet end of casing 21 and provided with a supply of carrier fluid through a valved supply line 30. Manifold 29 has a frustoconical section 31 surrounding and in coaxial relation to forming die 25. Section 31 is of reducing diameter towards a manifold discharge opening 32 which is located slightly beyond orifice 26. Thus, as shown, a relatively short length of plug 28 is directly surrounded with an annulus of carrier fluid in manifold section 31 just prior to emergence of the plug and carrier fluid through opening 32.

Opening 32 is connected by a valve 33 to the inlet end of a pipeline 34 in axial alignment with opening 32.

The launching system described is effective in providing a coaxial flow of continuous solids plug and carrier fluid into the pipeline inlet.

Means are preferably provided to permit operation of the pipeline 34 downstream while the launching system is inoperative. Such means comprises, as shown, a manifold 35 in communication with the pipeline adjacent its inlet end and supplied with carrier fluid through a line 36 provided with a valve 37. Thus, the pipeline may be operated by closing valve 30, opening valve 37 and closing valve 33.

When it is desired to launch a plug of pipeline cargo, the screw feed pump 20 is actuated with valves 30 and 33 open and valve 37 closed. The rate of injection of feed is balanced with the flow through valve 30 in order to establish satisfactory flow conditions.

The transported plug may be retrieved at the outlet of the pipeline in any appropriate manner.

One retrieval means is illustrated in FIGURE 1 and comprises a perforated section 38 of the pipeline surrounded by a manifold 39 having a drain pipe 40. When the plug and fluid annulus reach the section 38, the fluid annulus drains into the manifold and thence into the pipe 40. The plug 28, freed from the carrier fluid, is discharged from the end of the pipeline. A throat 41, of restricted diameter, may be provided in the pipeline immediately following the perforated section 38, to support the plug in the line when the carrier fluid is removed.

A modified form of retrieval means is shown in FIGURE 2 and comprises an endless travelling screen 42 onto which the plug and carrier fluid move on emergence from the end of the pipeline 34. The carrier liquid drains through the screen into a hopper 43 and the freed plug is discharged from the end of the screen.

We claim:
1. A process for the long distance transport by pipeline of particulate solids which comprises
  (a) pumping a carrier fluid through a long distance pipeline to provide a fluid stream flowing under pressure in one direction through said pipeline,
  (b) mixing said body of said solids with a binding liquid to form a semi-rigid paste,
  (c) forming said paste into a continuous cylindrical plug of substantially uniform diameter,
  (d) continuously feeding said cylindrical plug in said direction axially into said stream at one end of said pipeline,
  (e) said pipeline having an internal diameter larger than the diameter of said plug whereby said stream forms a longitudinally extending annulus surrounding said plug in said pipeline,
  (f) controlling the average velocity of said stream to render said velocity substantially uniform and constant throughout said pipeline and to cause flow of said plug with said stream,
  (g) constantly maintaining the continuous form of said plug during its entire passage through said pipeline whereby it flows with said stream in substantially unbroken condition, and
  (h) continuously retrieving said unbroken plug as it flows out of the other end of said pipeline.

2. A process for the pipeline transportation of particulate solids as defined in claim 1, wherein said plug has a velocity in said pipeline not substantially less than that of said stream.

3. A process for the pipeline transportation of particulate solids as defined in claim 2, said diameter of said plug being not substantially more than nine-tenths of said internal diameter of said pipeline.

4. A process for the pipeline transporation of particulate solids as defined in claim 1, wherein said forming step comprises the step of continuously extruding said paste.

5. A process for the pipeline transporation of particulate solids as defined in claim 4 wherein said plug is continuously extruded directly into said pipeline.

6. A process for the pipeline transportation of particulate solids as defined in claim 1, wherein said pumping step includes continuously pumping an annulus of said carrier fluid into said pipeline concurrently with said feeding of said plug.

7. A process for the pipeline transportation of particulate solids as defined in claim 1, wherein the liquid content of said plug is 5 to 30% by weight.

8. A process for the pipeline transportation of particulate solids as defined in claim 7, wherein the particle size of said solids is −4 mesh.

9. A process for the pipeline transportation of particulate solids as defined in claim 7, wherein the particle size range of said solids is −20 mesh.

10. Apparatus for the long distance transport by pipeline of particulate solids which comprises
  (a) a high pressure pump having an inlet, and a forming die having a cylindrical discharge orifice,
  (b) means for continuously feeding a mixture of particulate solids and a binding liquid to said inlet to provide a continuously extruded cylindrical plug of said mixture through said opening,
  (c) a long distance pipeline in axial communication with said orifice and having an inlet for reception of said plug, (d) means for feeding an annular stream of carrier fluid into said pipeline inlet substantially concurrently with said plug and in surrounding relation to said plug comprising a manifold surrounding said casing adjacent said outlet, and means for feeding carrier fluid into said manifold, said manifold having a cylindrical outlet portion coaxially arranged with respect to said forming die, (e) said pipeline having an outlet and means for retrieving said plug as it moves from said outlet comprising an endless travelling screen having a plug-receiving surface adjoining and in alignment with said outlet.

References Cited

UNITED STATES PATENTS

| | | | |
|---|---|---|---|
| 494,274 | 3/1898 | Kelly | 302—62 |
| 1,563,200 | 11/1925 | Leicknam | 302—66 |
| 1,954,005 | 4/1934 | Westberg et al. | |
| 2,614,892 | 10/1952 | Cherewick | 302—50 |
| 2,785,019 | 3/1957 | Caubet | 302—50 |
| 3,254,924 | 6/1966 | Harrison et al. | 302—14 |

FOREIGN PATENTS 1,087,974   8/1960   Germany.

EVON C. BLUNK, *Primary Examiner.*

M. L. AJEMAN, *Assistant Examiner.*